United States Patent [19]

Haji et al.

[11] 3,915,865
[45] Oct. 28, 1975

[54] HYDRO-SEPARATOR FOR SLURRY

[75] Inventors: Hideki Haji, Yokohama; Hiro Okada, Sagamihara; Tadao Takeuchi, Yokohama, all of Japan

[73] Assignee: Kurita Water Industries Limited, Osaka, Japan

[22] Filed: June 10, 1974

[21] Appl. No.: 477,928

[30] Foreign Application Priority Data
June 12, 1973  Japan.............................. 48-65448
June 12, 1973  Japan.............................. 48-65449

[52] U.S. Cl. ............... 210/329; 210/396; 210/400; 210/386
[51] Int. Cl.² .................................... B01D 33/04
[58] Field of Search ........... 100/90, 118, 121, 153; 210/324, 326, 329, 386, 400, 401, 396

[56] References Cited
UNITED STATES PATENTS

| | | | |
|---|---|---|---|
| 2,097,529 | 11/1937 | Nordell............. | 100/118 X |
| 2,554,968 | 5/1951 | Thompson............ | 100/90 |
| 3,176,607 | 4/1965 | Lapham............. | 210/329 X |
| 3,505,701 | 4/1970 | Keil................ | 100/121 X |
| 3,587,451 | 6/1971 | Luthi............... | 210/386 X |
| 3,613,564 | 10/1971 | Adamski et al...... | 210/386 X |
| 3,699,881 | 10/1972 | Levin et al......... | 210/386 X |

FOREIGN PATENTS OR APPLICATIONS
34,599  12/1964  Germany ........................... 100/152

Primary Examiner—John Adee
Assistant Examiner—Robert H. Spitzer
Attorney, Agent, or Firm—Oblon, Fisher, Spivak, McClelland & Maier

[57] ABSTRACT

A hydro-separator for slurry is disclosed which comprises two symmetrical sets each consisting of a horizontal conveyor zone, a downwardly vertical conveyor zone and a returning conveyor zone, a pair of symmetrical endless water-pervious belts adapted each to be revolved sequentially round the three zones in the corresponding set and opposed to each other in a space intervening between the two downwardly vertical conveyor zones, slurry feed units, water suction drums adapted to remove water from the slurry being conveyed respectively on the said belts, two pairs of squeezing drums disposed one at an upper level and the other at a lower level within the said downwardly vertical conveyor zones and opposed to each other in each of the said levels contiguously to each other across the opposed belts, and a scraper adapted to remove the dehydrated slurry adhering to the belt surface.

7 Claims, 1 Drawing Figure

U.S. Patent  Oct. 28, 1975  3,915,865
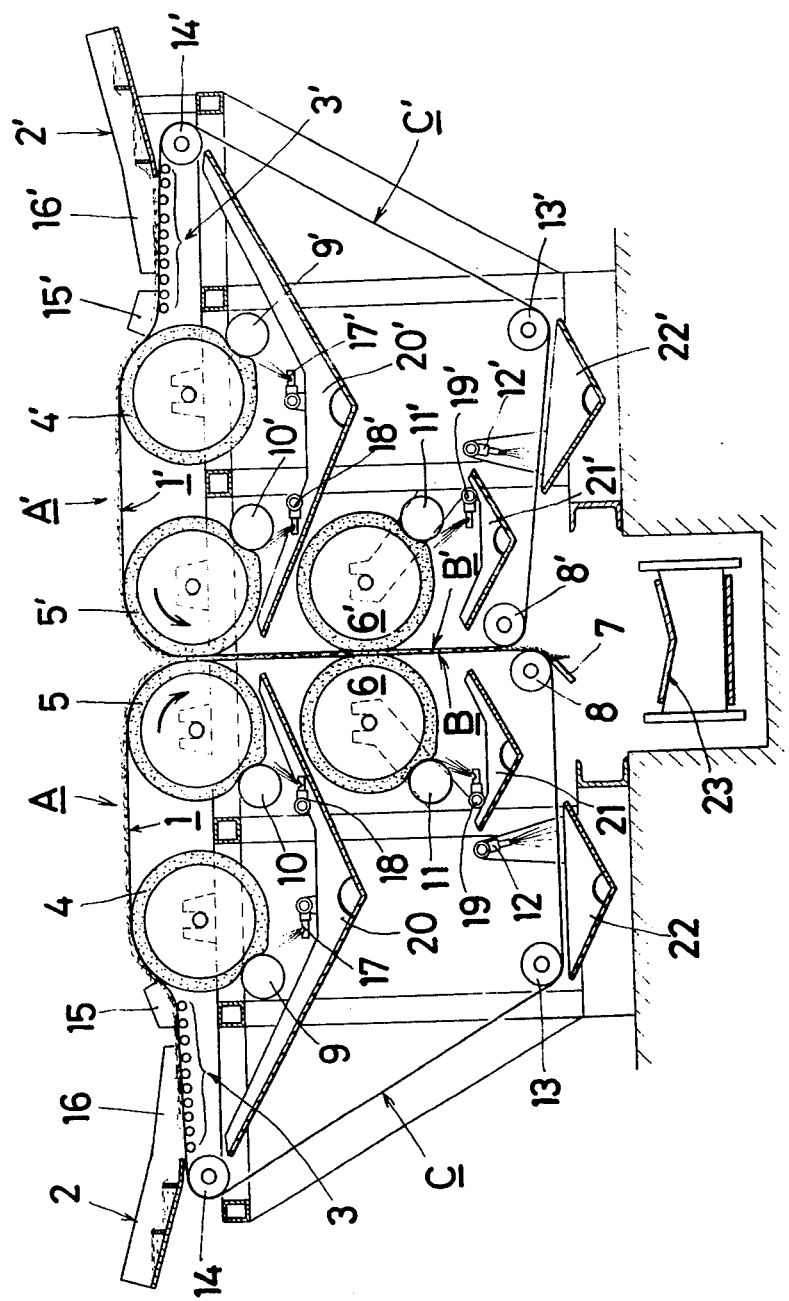

HYDRO-SEPARATOR FOR SLURRY

BACKGROUND OF THE INVENTION

This invention relates to an apparatus for removing water continuously at high efficiency from a slurry-like substance such as, for example, sludge by use of a water-absorbing material.

When sludge is supplied directly to the surface of a water-absorbing substance such as a spongelike material so as to have the water in the sludge absorbed by the water-absorbing substance, the sludge immediately fills up the water-absorbing pores in the water-absorbing substance and consequently seriously degrades the water-removing efficiency of the water-absorbing substance, making it necessary to change the water-absorbing substance at frequent intervals. Further the portion of sludge which has entered the pores coagulates in the shape of root hairs, whose complete removal from within the pores is extremely difficult. This difficulty is generally precluded by following a practice of placing a water-permeable membrane such as filter cloth on the surface of the water-absorbing substance so that the sludge is deposited on the water-permeable membrane and only the water is allowed to be absorbed by the water-absorbing substance to accomplish the desired dehydration of sludge.

This method has a disadvantage that the dehydration efficiency is limited within a definite range because of the nature of the particular water-absorbing substance in use, the treating capacity is small for slurry of a small water content and the caked sludge obtained after the dehydration still has a high water content.

One object of this invention is to provide an apparatus for removing water continuously at high efficiency from large volumes of slurry by use of water-absorbing substance and water-pervious belts.

Another object of this invention is to provide an apparatus for removing water at high efficiency from slurry, which apparatus can be operated ecomonically because the consumption of the water-absorbing substance and the wear of the water-pervious belts are both very small.

BRIEF SUMMARY OF THE INVENTION

This invention relates to an apparatus for removing water continuously at high efficiency from slurry such as, for example, sludge.

To be specific, the apparatus of this invention comprises two symmetrical sets each consisting of a horizontal conveyor zone, a downwardly vertical conveyor zone and a returning conveyor zone, a pair of symmetrical endless water-pervious belts adapted each to be revolved sequentially round the three zones composing the corresponding set and opposed to each other in a space intervening between the two downwardly vertical conveyor zones, slurry feed units disposed to serve the said horizontal conveyor zones respectively, draining means adapted to remove water adhering to the water-pervious belts, water suction drums adapted to remove water from the slurry being conveyed respectively on the said belts, upper squeezing drums disposed on the inside of the bends of the respective endless water-pervious belts formed between the horizontal conveyor zones and the downwardly vertical conveyor zones in such way that they keep intimate contact with the said endless water-pervious belts and stand contiguously to each other across the opposed endless water-pervious belts, lower squeezing drums disposed in the respective downwardly vertical conveyor zones below the said upper squeezing drums in such way that they stand contiguously to each other across the said opposed endless water-pervious belts, and a means adapted to synchronize the traveling speed of the water-pervious belts with the peripheral speed of the corresponding water suction drums.

This invention embraces an apparatus wherein the water suction drums are rigid cylinders having the surfaces thereof coated with a water-absorbing porous elastic material such as spongelike materials and the said drums are of the type incorporating therein squeezing rolls.

This invention also embraces scrapers disposed close to the endless water-pervious belts to the posterior of the said lower squeezing drums for the purpose of peeling the dehydrated slurry from the said belts and belt holders disposed respectively in the horizontal conveyor zones.

Further this invention embraces means to rotate the water suction drums and revolve the endless water-pervious belts in such way that the peripheral speed of the former and the traveling speed of the latter are synchronized with each other.

In the apparatus of the present invention, the two endless water-pervious belts are revolved circularly round the conveyor zones and the slurry to be dehydrated such as, for example, sludge is continuously fed to the said belts by means of the respective slurry feed units. While in travel on the belts, part of the water contained in the sludge is first separated by virtue of gravitational attraction then allowed to pass through the belts and removed from the lower sides of the belts. The sludge continous to travel in conjunction with the belts and reaches the water suction drums which dehydrate the sludge and convert it into a concentrated sludge. During the travel between the upper and lower pairs of squeezing drums, the layers of sludge on the two belts are combined into one and squeezed to release the entrained water. The dehydrated sludge moves together with the belts and arrives at the returning conveyor zone, at which time the sludge is removed from the belt surface by means of the scraper. The belts which have thus been deprived of the sludge further advance and return to the respective horizontal conveyor zones.

Other objects and other characteristic features of the present invention will become apparent from the description to be given in further detail herein below with reference to the attached drawing.

BRIEF EXPLANATION OF THE DRAWING

The drawing represents a longitudinal cross section in side elevation of a typical arrangement of the apparatus according to this invention.

DETAILED DESCRIPTION OF THE INVENTION

The present invention will be described with reference to the drawing which illustrates the most standard apparatus of the present invention.

In the drawing, 1 and 1' denote endless water-pervious belts. A and A', B and B' and C and C' denote horizontal conveyor zones, downwardly vertical conveyor zones and returning conveyor zones respectively. The endless water-pervious belts 1 and 1' are revolved sequentially round the conveyor zones in the order mentioned above. As illustrated in the drawing, the endless water-pervious belts 1 and 1' are opposed to each other during the travel through the downwardly vertical conveyor zones B and B' and are positioned symmetrically to each other during the travel through the horizontal conveyor zones A and A' and the returning conveyor zones C and C' with reference to the downward vertical conveyor zones B and B' as the axis of symmetry.

The numerals 2 and 2' denote the slurry feed units serving to supply the slurry subjected to dehydration onto the endless water-pervious belts. These units are disposed above the belts at the starting points of the respective horizontal conveyor zones A and A'. They open in the direction of the belt surfaces. The said conveyor zones are provided, next to the slurry feed units, with draining means 3 and 3' to remove water in the direction of the downsides of the said belts 1 and 1'. The endless water-pervious belts are made of a material such as, for example, filter cloth which permits passage of water and checks passage of solid matter.

When the slurry such as, for example, sludge (hereinafter referred to representatively as "sludge") is delivered by the slurry feed units 2 and 2' onto the respective endless waterpervious belts 1 and 1', part of the water contained in the sludge is separated by virtue of gravitational attraction, then allowed to pass through the said belts and emerge to the lower sides of the belts. This water generally adheres in the form of films to the lower sides of the belts and does not fall off the belts until it accumulates to a fixed weight. The films of water thus formed, therefore, obstruct spontaneous removal of water from the sludge.

The aforementioned draining means 3 and 3' serve the purpose of mechanically removing the water adhering to the lower sides of the said belts. In the illustrated embodiment, groups of table rolls adapted to be frictionally rotated by the motion of the respective belts are shown as typical examples of such means. The table rolls function to support the traveling belts in a horizontal direction and, at the same time, rupture the films of adhering water by means of the contact therewith and further generate an action to draw the water away from the belt by their rotating motion. Consequently, they provide highly effective removal of water from the lower side of the belts.

Nonrotatably fixed bar-shaped members, stationary latticed members, suction boxes and so forth are available as effective draining means. Denoted by 4 and 4', 5 and 5' and 6 and 6' are respectively water suction drums, upper squeezing drums and lower squeezing drums. The endless water-pervious belts are moved simultaneously with the rotation of these water suction drums and squeezing drums. These drums are rigid cylinders made of iron, for example, and having their surfaces covered with a water-absorbing porous elastic material. The water-absorbing porous elastic materials which are usable for this purpose include natural products such as sponge and foamed synthetic resins containing continuous cells such as polyvinyl formal sponge, for example.

The sludge which has passed the draining means 3 and 3' moves on in conjunction with the belts from the horizontal conveyor zones to the downwardly vertical conveyor zones. During this travel, the sludge is stripped of water by virtue of the water suction drums 4 and 4' and the upper and lower pairs of squeezing drums. The sludge and the water suction drums are separated by the belts. Since the belts are made of a material pervious to water, the water contained in the sludge very easily passes through the belts and is then removed by the said water suction drums.

The aforementioned water-absorbing action originates from the water-absorbing porous elastic material employed to cover the surfaces of the drums.

At the water suction drums 4 and 4', the dehydration of sludge takes place on the respective belts. At the upper and lower pairs of squeezing drums, however, the dehydration is effected collectively on the sludge resulting from the combination of the layers of sludge held on the respective belts. As illustrated in the drawing, the layers of sludge which have been dehydrated respectively by the water suction drums 4 and 4' are jointly introduced into the opening between the upper squeezing drums 5 and 5'. The said squeezing drums 5 and 5' are disposed on the inside of the bends of the respective endless belts formed while in transfer from the horizontal conveyor zones to the downwardly vertical conveyor zones in such way that they keep intimate contact with the belts and stand contiguously to each other across the opposed belts. Thus, the sludge on entering the space between the two opposed belts is squeezed by the two drums to be stripped of the entrained water. The sludge which has been stripped of water by the upper squeezing drums 5 and 5' is subsequently dehydrated by the lower squeezing drums 6 and 6' by the same action as that produced by the upper squeezing drums 5 and 5'. To the posterior of the said lower squeezing drums, there are disposed scrapers 7 in such way that the extremities thereof approach the endless water-pervious belts. The dehydrated sludge, while continuing its travel with the belts, is removed from the belt surface by these scrapers.

For perfect removal of the sludge from the belt surfaces, it is necessary that the extremities of the scrapers should be brought as close to the belt surfaces as possible. It is, therefore, impossible to keep the belts absolutely free from possible injury by the scrapers, with the result that the service life of the belts will be shortened. Since two belts are in use, two scrapers are required one for each belt. As indicated below, the apparatus of this invention incorporates a design intended to increase the service life of these belts. The turn rolls 8 and 8' are positioned where the belts transfer from the downwardly vertical conveyor zones to the returning conveyor zones. In the drawing, the two turn rolls are disposed at different levels one higher than the other. And only one scraper is disposed to serve exclusively the belt 1 which keeps intimate contact with the turn roll 8 at the lower level. When the positions at which the belts transfer from the downwardly vertical conveyor zones to the returning conveyor zones are separated to two different levels as illustrated in the drawing, the greater part of the sludge adhering to the belt 1' which changes the direction of its travel at a higher level than the other as shown in the diagram is transferred to the belt 1 which makes the same change of direction at a lower level. Consequently, no scraper is required with respect to the belt 1'. Thus, the belt 1' is completely safe from possible injury by the scraper and, therefore, keeps its service life unimpaired.

Now a description will be made about means which serve the purpose for removing water from the water-absorbing porous elastic material used on the water suction drums.

The present invention is further inclusive of an apparatus in which squeezing rolls are disposed where the water-absorbing porous elastic covers wrapped around the water suction drums and the squeezing drums are out of contact with the belts and the said rolls are held in tight contact with the said water-absorbing porous elastic covers in order for the rolls to exert strong pressure upon the covers. Accordingly, the water-absorbing porous elastic covers of the respective water suction drums which have absorbed the water from the sludge are immediately pressed forcefully by the squeezing rolls and consequently stripped of the water. This means that the water suction drums can be continuously operated with their water-absorbing ability maintained absolutely unimpaired.

In the drawing, 9 and 9', 10 and 10' and 11 and 11' denote squeezing rolls provided respectively with water suction drums 4, 4', upper squeezing drums 5, 5' and lower squeezing drums 6, 6'.

Now another preferred embodiment of the present invention will be described by way of illustration.

For example, the water suction drums are built in a hollow construction, with the hollow portion connected in one direction to the water-absorbing porous elastic covers and in the other direction to a vacuum pump. By this arrangement, the removal of the water from the said covers can easily be accomplished by operating the vacuum pump.

In the illustrated apparatus, two pairs of squeezing drums are disposed, one pair at a higher level and the other pair at a lower level. Where the slurry by nature makes its dehydration difficult or where a high degree of dehydration is required, for example, one or more pairs of squeezing drums may be disposed between the said two pairs of squeezing drums. These intervening squeezing drums are completely identical in construction and function with the squeezing drums already described above. In the drawing, 12 and 12' denote nozzles for jetting water or air. The removal of the dehydrated sludge from the water-pervious belts can be accomplished more thoroughly by jetting columns of water or air through the said nozzles against the rear surfaces of the belts from which the sludge has already been scraped. Although in the illustrated apparatus, only two injection nozzles are disposed one for serving each of the returning conveyor zones, there may be used a plurality of injection nozzles for each of the said zones. In the drawing, 13 and 13' and 14 and 14' denote turn rolls which are required for ensuring smooth motion of the respective belts. The number of these rolls and the location thereof are not necessarily limited to those illustrated in the drawing.

In order for the apparatus of this invention to be operated economically at high efficiency, it is desirable that the traveling speed of the water-pervious belts and the peripheral speed of the water suction drums should be synchronized. For this purpose, it is desirable that one of the belts or water suction drums or squeezing drums should be driven by some prime mover so that the driving force being exerted thereon may be transmitted and utilized for driving the rest of belts or water suction drums or squeezing drums. In the apparatus of this invention, if the individual drums and belts are driven by separate motive forces, then the entire apparatus cannot be operated smoothly for the reason described herein below even if the traveling speed of the belts and the peripheral speed of the water suction drums are equalized.

The surfaces of the water suction drums are covered with a highly elastic material. Therefore, their actual diameters constantly change because of the contact with the passing belts and, consequently, the actual peripheral speed thereof is variable. In the presence of this variation, it is difficult to have the drums rotated always at a fixed peripheral speed. As a result, a difference occurs between the peripheral speed of the drums and the traveling speed of the belts, causing slippage between the belts and the respective drums and consequently exerting abnormal frictional force between the belts and the drums. The friction inflicts damage on both the belts and drums to cut their service life heavily.

Thus, it is in the least desirable to have the individual drums and belts driven independently of one another. Actually with the apparatus according to this invention, however, it is also difficult to have only one of the belts and drums driven by a motive force and the rest of belts and drums driven by means of the driving force exerted on the said one element.

In the drawing, the water suction drums and the upper pair of squeezing drums are disposed on a common plane. And the upper and lower pair of squeezing drums are disposed in almost same perpendicular line. This means that the belts are held in contact with the corresponding upper squeezing drums through one sixth of the entire circumferential surface thereof. The areas of contact established therebetween are large. As a result, the belts and the upper squeezing drums easily transmit the driving force to each other.

By contrast, the areas of contact established between the water suction drums and the belts or between the lower squeezing drums and the belts are extremely small as shown in the drawing. Therefore, mutual transmission of the driving force is difficult to achieve through such small areas of contract.

This invention embraces a means for enabling the water suction drums and the respective belts to transmit the driving force to each other.

It is seen from the drawing that in the horizontal conveyor zones, belt holders 15 and 15' are disposed immediately before the starting point of contact between the belts and the corresponding water suction drums, which holders are adapted to apply pressure to the opposite edges in the direction of the width of the said belts. These belt holders serve the purpose of increasing the areas of contact between the belts and the water suction drums. In the illustrated case, the areas of contact are one quarter of the entire circumferential surfaces, making it possible for the water suction drums and the belts to transmit the driving force to each other. The areas of contact between the belts and the corresponding drums can further be increased by suitably selecting the positions of these two belt holders.

Owing to the incorporation of these belt holders, therefore, the driving force exerted on one member of the group consisting of water suction drums, upper squeezing drums and belts will also cause the rest of members of the said group to be driven at the same speed. The driving of the belts can be effected by a known method as by driving turn rolls, for example.

Only in the case of the lower squeezing drums, however, is it difficult to effect driving by the above-described method, since their areas of contact of these drums with the belts are so small that the driving force mentioned above cannot effectively be transmitted thereto. It is, therefore, necessary that these drums should be drivin separately of the members mentioned above so as to produce a peripheral speed synchronous with the traveling speed of the belts. Since the belt holders thus incorporated permit mutual transmission of the driving force among the drums and the belts except in the case of the lower squeezing drums, otherwise possible injuries to the belts and the drums can be lessened to a great extent.

In the illustrated apparatus, the belts are inclined upwardly by belt holders 15, 15' in a gradient of about one-fiftieth in the direction of their travel. At the positions following the discharge mouths of the slurry feed units 2 and 2' and preceding the belt holders 15 and 15', stop boards 16 and 16' are disposed along the opposite edges of the belts. These stop boards are erected parallel with the belts and serve the purpose of preventing the slurry of high water content from spreading and consequently falling off the opposite edges of the belts. These stop boards 16 and 16' coupled with the aforementioned upward inclination of the belts lengthen the retention time of the slurry on the draining means 3 and 3' and, consequently, notably improve the water-removing effect at these positions.

In the illustrated apparatus, the slurry feed units 2 and 2', the turn rolls 14 and 14', the water suction drums 4 and 4', the upper squeezing drums 5 and 5', etc., are mounted on the horizontal beam supports which are held in position by racks incorporating a few props and the other members are also disposed on racks formed of props similarly to those mentioned above.

The numerals 17 and 17', 18 and 18' and 19 and 19' denote water-jetting units positioned to the anterior of the starting points of contact between the water-absorbing porous covers wrapped around the water suction drums and the corresponding squeezing rolls. The water-absorbing porous elastic covers on the water suction drums, while sucking the water from the sludge, also absorb small amounts of very finely divided particles. When the water-absorbing porous elastic covers which have absorbed water and such particles are saturated to capacity with the water from the aforementioned water-jetting units, the absorbed finely divided particles are removed in conjunction with the water as the covers are pressed forcefully by the squeezing rolls. Thus, the water suction drums' ability to remove the water from the sludge is not degraded at all. Denoted by 20 and 20', 21 and 21' and 22 and 22' are water receptacles which are disposed below the water suction drums, belts, etc. They are adapted to collect the falling water by a suitable known method and discharge the collected water out of the apparatus. The sludge which has been stripped of water and scraped off the belts may suitably be accumulated and discharged. The belt conveyor 23 shown in the drawing serves the purpose of withdrawing the sludge from within the apparatus.

We claim:

1. An apparatus for stripping slurry of water contained therein, which comprises in combination:

two endless water-pervious belts movable through a horizontal conveyor zone, a downward vertical conveyor zone adjacent said horizontal conveyor zone and a returning conveyor zone joining said downward vertical conveyor zone and said horizontal conveyor zone, said belts being opposed to each other in said downward vertical conveyor zone and being disposed, in said horizontal and returning conveyor zones, at positions symmetrical with respect to said downward vertical conveyor zone, slurry feed units which open toward outer surfaces of the corresponding endless water-pervious belts at predetermined points in said horizontal conveyor zones, draining means and water suction drums engaging inner surfaces of said endless water-pervious belts at positions beyond the positions of said slurry feed units in said horizontal conveyor zones for removing said water from said belts.

upper squeezing drums engaging inner surfaces of said endless water-pervious belts at points at which said belts transfer from said horizontal conveyor zones to said downward vertical conveyor zones, said drums positioned contiguously across both said endless water-pervious belts, lower squeezing drums disposed respectively below said upper squeezing drums and engaging inner surfaces of said endless water-pervious belts, said lower squeezing drums positiond contiguously across said endless water-pervious belts said water suction drums and said upper and lower squeezing drums comprising rigid cylinders whose outer surfaces are covered with a water-absorbing porous elastic material; and, driving means coupled to at least one of said belts for synchronizing the traveling speed of the said endless water-pervious belts with the peripheral speed of said water suction drums and said upper and lower squeezing drums.

2. The apparatus of claim 1, wherein:

said draining means includes table rolls engaging inner surfaces of said belts for removing water from said belts.

3. The apparatus of claim 1, wherein:

said draining means includes nonrotatable bar-shaped members engaging inner surfaces of said belts for removing water from said belts.

4. The apparatus of claim 1, wherein squeezing rolls engage said water-absorbing porous elastic covers wrapped around said water suction drums and said upper and lower squeezing drums at positions out of contact with said endless water-pervious belts in such way that they are capable of pressing said water-absorbing porous elastic covers.

5. The apparatus of claim 1, wherein scrapers are disposed below said lower squeezing drums in such way that the extremities thereof approach the outer surface of at least one of said water-pervious belts.

6. The apparatus of claim 5, wherein the lower ends of said downward vertical conveyor zones fall on different levels, one higher than the other, and only one scraper is included to serve exclusively the belt whose lower end falls on the lower of said levels.

7. The apparatus of claim 1, wherein belt holders engage said endless water-pervious belts at positions adjacent contact points between said endless water-pervious belts and said water suction drums for increasing the areas of contact between said water suction drums and said endless water-pervious belts.

\* \* \* \* \*